United States Patent Office 2,833,539
Patented May 6, 1958

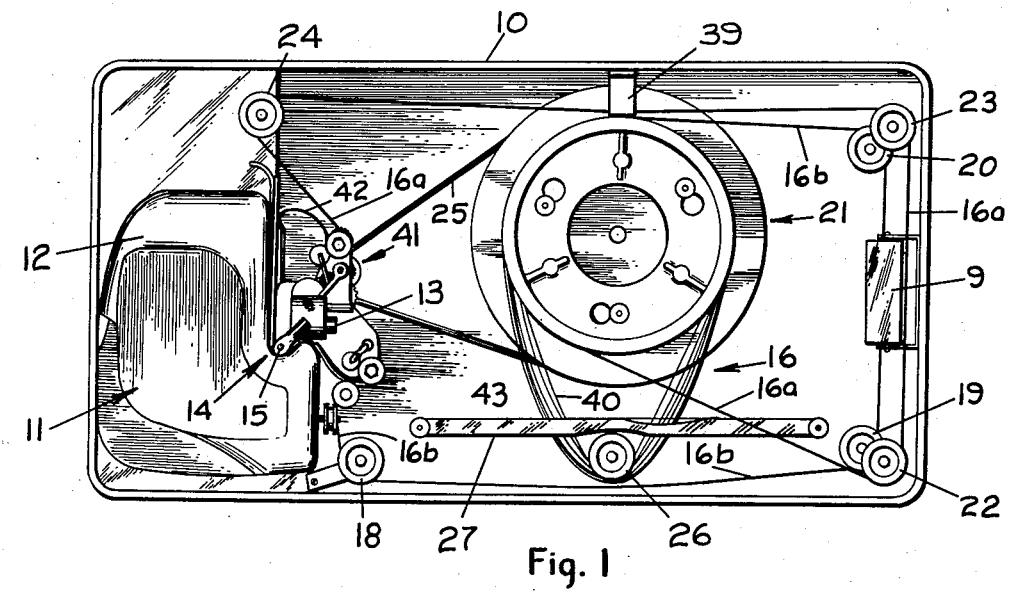

2,833,539

STORAGE REEL FOR ENDLESS RIBBON FILM

Stephen A. Platt, Grand Haven, Mich.

Application September 7, 1955, Serial No. 532,854

7 Claims. (Cl. 271—2.18)

This invention relates to a storage reel for an endless ribbon. More particularly, this invention relates to a storage reel for a self-contained projector unit in which the film is an endless ribbon.

One type of motion picture projector which is becoming increasingly popular is the endless film type. This particular invention relates to a self-contained projector in which the film is an endless ribbon. The bulk of the film is stored in a coil about a storage reel from which it is withdrawn and recoiled. One difficulty which has been experienced with such units is the excessive tension exerted on the film, thus causing the film to break frequently. This excessive tension is caused in part by the difference in the rate at which the film is removed from the storage loop and the rate at which it is rewound on the storage reel.

Tension is also caused by differences between the angular velocity of the coil of film and of the storage reel. This sometimes causes the film to bind tightly about the hub of the storage reel. Another cause of tension is binding between the edges of the film and the sides of the reel. This also causes rapid deterioration of the film as well as frequent breakage.

An object of this invention is to eliminate the excessive tension created on the film as it is wound on the storage reel.

Another feature of this invention is to provide a storage reel which facilitates the winding and unwinding of the film without abrasion to either the surfaces or edges of the film.

Other objects of this invention will become evident upon reading the following specification in conjunction with the accompanying drawings wherein:

Fig. 1 is a side elevational view of the interior of a self-contained projector unit.

Fig. 2 is a side elevational plan view of the storage reel of this invention.

Fig. 3 is an exploded end view of the storage reel showing the front disk and film ring in section.

Fig. 4 is a side elevational view of the assembled storage reel of this invention showing the front disk and film ring in section.

Fig. 5 is an enlarged, fragmentary partially sectional view of the peripheral portions of the storage reel.

Briefly, this invention is concerned with a novel type storage reel for an endless ribbon. This storage reel includes a freely rotating ring seated about the hub of the reel. This ring rests upon ridges in the reel hub. These ridges allow the ring to slip before excessive tension is exerted on the film as it is being wound and unwound on the storage reel.

A better understanding of my invention can be obtained by referring to the drawings. It should be understood, however, that in describing this invention that ("inwardly") shall be taken to mean inwardly toward the axis of the reel. ("Outwardly") shall then mean outwardly away from the central axis of the reel.

Fig. 1 shows a metal or plastic casing 10 in which is mounted a projector assembly 11 having a cover 12, lens 13 and lever 15 which permits the film to be threaded through the intermittent drive mechanism 14. The projector 11 is adapted to reflect a picture off mirror 9 against a screen (not shown) incorporated in the casing 10.

The projector assembly may be of a conventional type suitable for self-contained projector units. Thus, all of the elements thereof may be conventional and no specific description thereof is considered necessary.

The film is initially withdrawn from the inside of the storage coil 40. It travels along the rim 16 passing over spools 22, 23 and 24. The film then passes through the constant drive unit 41 into the slack loop 42. It is intermittently withdrawn from the slack loop 42 by the intermittent drive unit 14 behind the lever 15 and in so doing passes between the light source and the lens 13. It then passes through the constant drive discharge unit 43. The return end of the film passes over spools 18, 19, and 20. The film is rewound on the outside of the film coil 40. The storage reel 21 is driven by the belt 25 in synchronism with the intermittent driving mechanism 14. The individual layers of the film are aligned on the reel 21 by a downwardly projecting guide finger 39. The end of the film coil 40 passes around the freely rotatable pulley 26, and is kept by the guide bar 27 in overlaying position.

This invention relates entirely to the storage reel 21 which is adapted to prevent excessive tension in the film. The storage reel consists of a large disk 28 having a groove 37 forming a pulley and a smaller disk 29 joined together by a hub formed by the recessed portions 30 and 31. The disks are preferably made of plastic which may or may not be reinforced. The recessed portions 30 and 31 extend toward each other and are secured together by screws 32 which pass through the keyhole type slots 33.

Each of the recessed portions 30 and 31 has a radially projecting circumferential ridge 35 and 34 respectively, extending around the entire periphery of the hub. The crests or apices of this ridge are narrow, these ridges being substantially triangular in cross section. These ridges 34 and 35 provide a bearing surface for ring 36 which is loosely surrounding the hub between the disks 28 and 29. Ridges 34 and 35 and ring 36 prevent excessive tension on the film. This ring may be of any suitable material which has a low coefficient of friction when bearing against the hub. One particular material suitable for the purpose is steel.

The ring 36 has an inside diameter slightly greater than the diameter of the ridges 34 and 35. Its diameter is such that it clears the bottom of the ridges by approximately 3/32 of an inch. Thus the ring 36 rests only upon the points of the ridges adjacent the top of the hub. The ring's width is less than that of the hub. Thus, it does not touch the side walls on either side. The reel 21 is driven by belt 25 and rotary motion is imparted to the ring 36 by the rotation of the reel 21. However, the ring 36 is free to slide around the hub. Thus, before excessive tension is exerted on the film, the ring 36 slides on the ridges 34 and 35. This relieves the tension in the film.

The contact between the ring 36 and ridges 34 and 35 must be sufficient normally to prevent relative rotary movement between the ring and the rest of the reel, causing the ring to wind the film on so that the film being drawn off does not have to supply winding tension. The configuration of ridges 34 and 35 can be varied in accordance with different conditions. The ridges need not be continuous for all cases but can be spaced along the circumference of the hub or flange. The hub comprising the recessed portions 30 and 31 is wider than both the ring 36 and the film to prevent a drag being imposed upon the film by the sides of the reel. Of course, if contact is made by a few layers with one side of the reel, the drag will not be noticeable, but if it contacts both, it will be serious and detrimental to the operation of the device. In order to eliminate this source of drag, the upstanding side flange 38 of the disk 29 is made shorter than that of the disk 28. With this arrangement, film is stacked on the ring 36, such stack extending above the flange 38. The guide finger 39 prevents lateral dislocation of the stacked film on the reel.

ASSEMBLING OF REEL

Assembly of the reel is simple since it constitutes only three major parts. The disk 29 is mounted on the disk 28 with the ring 36 in place. The disks are locked together by passing the keyhole slots 33 over the screws 32 and then rotating disk 29 sufficiently to cause the screws 32 to seat in the narrow portions of the keyholes 33. Then the screws 32 are tightened in order to secure the disks 28 and 29 more tightly together.

Operation

The operation of the device is simple. The storage reel 21 is mounted on a stud secured to the back of the case 10. The storage reel 21 is adapted to carry the film coil 40 with the coil's lower end riding about the spool 26. The leading end 16a of the film is run over the spools 22, 23 and 24 and through the intermittent driving mechanism 14 of projector 11. The trailing end 16a, that is, the end returning from the projector, is run over spools 18, 19 and 20 and rewound on the storage reel 21.

The movement of the film, except as it passes behind the lens and through the slack loops on each side of the lens, is constant. Thus, the rate of withdrawal of the film from the film coil 40 and the rate of return to it does not fluctuate. The storage reel 21 is driven in synchronization with the rest of the projection mechanism at an angular velocity exactly correct to discharge from the inside of the film coil 40 the precise length of film necessary to supply the constant demand made by the projector when the film coil is loaded.

However, in practice, the constant angular velocity of the storage reel does not result in a constant reaction on the film. This lack of synchronization arises from several factors such as wide variations in film moisture, surface conditions and shrinkage. It is particularly important that this lack of synchronization be prevented from causing the film to be pulled from the film coil. Any pulling will result in cinching the film together about itself, the reel 21 and the pulley 26.

The compensator ring 36 is used to eliminate these difficulties. It provides a means of effecting differentiation in angular velocity between the reel 21 and the film coil 40. It has sufficient bearing contact with the reel 21 to rotate the film coil when the angular velocities are synchronized. At the same time, it will permit slippage between the film coil and the reel when necessary before tension is built up in the film.

This invention eliminates all types of excessive tension exerted on the film. Accordingly, as the projector continuously runs, no excessive tension is exerted on any part of the film and the film will last much longer than with other type reels.

It should be understood that in describing this invention I have shown preferred embodiments which should not be considered to limit the scope of this invention except as specified in the appended claims. Furthermore, other modifications of this invention can be made all within the scope of the spirit of this invention and such modifications will be covered by this invention unless the claims by their language expressly state otherwise.

I claim:

1. A storage reel for an endless ribbon; said reel having two disks connected together by a hub; the improvement comprising: radially extending protrusions located along the periphery of said hub; said protrusions spaced from each of said disks; and a ring freely seated on said protrusions.

2. A storage reel for an endless ribbon; said reel having two disks connected together by a hub; the improvement comprising: radially extending protrusions located along the periphery of said hub; and a ring freely mounted on the protrusions of said hub, said ring having an inside diameter greater than the outer peripheries of said ridges and a width less than the width of said hub.

3. A storage reel for an endless ribbon; said reel having two disks connected together by a hub; the improvement comprising: ridges located along the periphery of said hub; the periphery of each of said ridges coming substantially to a point; and a ring freely mounted on the ridges of said hub, said ring having a width less than the width of said hub and an inside diameter greater than that of the outer peripheries of said ridges whereby said ring rests only upon the upper portions of said ridges.

4. A storage reel for an endless ribbon; said reel having two disks with axially extending flanges, said flanges being connected together to form a hub; the improvement comprising: a ridge located along the periphery of each of said flanges; said ridges being spaced from each of said disks; and a ring freely mounted on the said ridges.

5. A storage reel for an endless ribbon; said reel having two disks with axially extending flanges, said flanges being connected together to form a hub; the improvement comprising: a ridge located along the periphery of each of said flanges; and a ring freely mounted on the said ridges; said ring having an inside diameter greater than the outer peripheries of said ridges and a width less than the width of said hub.

6. A storage reel for an endless ribbon; said reel having two disks with axially extending flanges, said flanges being connected together to form a hub; the improvement comprising: a ridge located along the periphery of each of said flanges; the periphery of each of said ridges coming substantially to a point; and a ring freely mounted on the said ridges; said ring having a width less than the width of said hub and an inside diameter greater than that of the outer peripheries of said ridges whereby said ring rests only upon the upper portions of said ridges.

7. In a storage reel adapted to support a coil or endless ribbon, the combination comprising: a hub; a ring seated about said hub; a radially projecting protuberance on said hub adapted to contact said ring and of less diameter than said ring; radially projecting means at each end of said hub adapted to prevent lateral displacement of said ring.

References Cited in the file of this patent

UNITED STATES PATENTS

| 1,627,198 | Penin | May 3, 1927 |

FOREIGN PATENTS

| 16,185 | Great Britain | Sept. 23, 1891 |
| 697,203 | Germany | Oct. 8, 1940 |